United States Patent
Sijpkes et al.

(10) Patent No.: US 8,940,378 B2
(45) Date of Patent: Jan. 27, 2015

(54) METHOD FOR THE MANUFACTURING OF A HOLLOW FIBER REINFORCED STRUCTURAL MEMBER

(75) Inventors: Tjaard Sijpkes, RK Geldrop (NL); Peet Vergouwen, SM Boekel (NL); Bert Thuis, NT Marknesse (NL)

(73) Assignee: Fokker Landing Gear B.V., Helmond (NL)

( * ) Notice: Subject to any disclaimer, the term of this patent is extended or adjusted under 35 U.S.C. 154(b) by 1576 days.

(21) Appl. No.: 11/913,464

(22) PCT Filed: May 2, 2006

(86) PCT No.: PCT/NL2006/000235
§ 371 (c)(1),
(2), (4) Date: Mar. 7, 2008

(87) PCT Pub. No.: WO2006/118448
PCT Pub. Date: Nov. 9, 2006

(65) Prior Publication Data
US 2008/0187699 A1    Aug. 7, 2008

(30) Foreign Application Priority Data
May 3, 2005    (NL) .................................. 1028946

(51) Int. Cl.
*D04C 1/06*  (2006.01)
*B29C 70/32*  (2006.01)
(Continued)

(52) U.S. Cl.
CPC ............... *D04C 1/06* (2013.01); *B29C 70/083* (2013.01); *B29C 70/32* (2013.01); *B29C 70/446* (2013.01); *B29C 70/48* (2013.01); *D10B 2505/02* (2013.01)

USPC .......... 428/36.3; 264/478; 264/512; 264/513; 264/516

(58) Field of Classification Search
CPC ...... B29C 70/32; B29C 70/446; B29C 70/48; D04C 1/06; D10B 2505/02
USPC .................. 428/36.3; 264/478, 512, 513, 516
See application file for complete search history.

(56) References Cited

U.S. PATENT DOCUMENTS 4,469,730 A * 9/1984 Burhans ....................... 428/36.3
4,657,795 A * 4/1987 Foret ........................... 280/281.1
(Continued)

FOREIGN PATENT DOCUMENTS

EP    0 012 167    6/1980
EP    0 295 820    12/1988
(Continued)

OTHER PUBLICATIONS

"Braiding" in Lee, Stuart M. (1993). Handbook of Composite Reinforcements. John Wiley & Sons, p. 24-40.*
(Continued)

*Primary Examiner* — Michele L Jacobson
(74) *Attorney, Agent, or Firm* — Oblon, Spivak, McClelland, Maier & Neustadt, L.L.P.

(57) ABSTRACT

The invention provides a method of manufacturing a hollow fiber reinforced structural member, in particular for air vehicles, comprising the steps of providing a first circular braiding layer, positioning a flat strengthening body comprising at least one fabric layer having warp fibers and a woof fiber against a part of the surface of the first braiding layer, providing a second braiding layer around the first braiding layer and the strengthening body, positioning the combination of the first braiding layer, the strengthening body and the second braiding layer in a mold, impregnating the combination with resin, removing the combination as impregnated with a resin from the mold.

14 Claims, 1 Drawing Sheet

Figure 1:
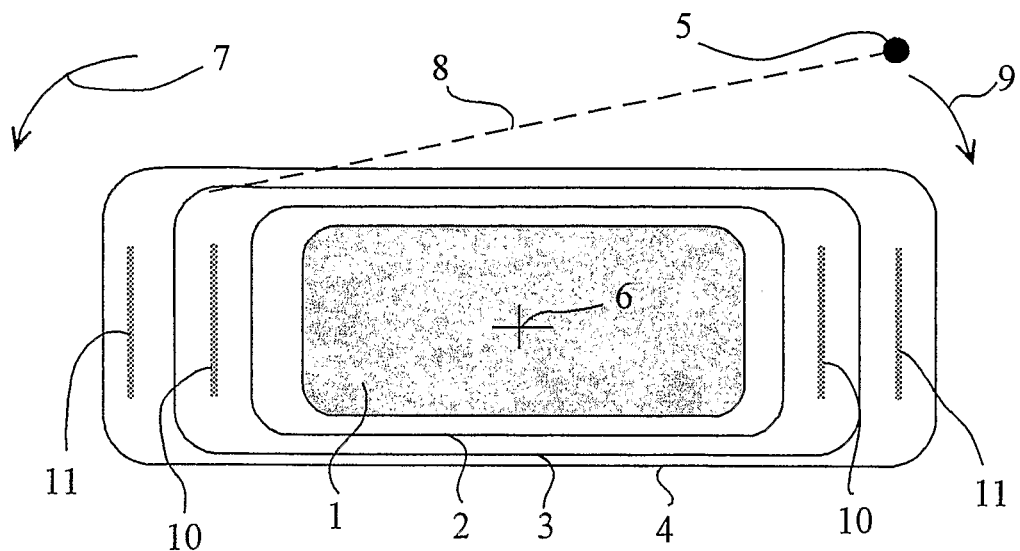

(51) Int. Cl.
  *B29C 70/08* (2006.01)
  *B29C 70/44* (2006.01)
  *B29C 70/48* (2006.01)

(56) References Cited

U.S. PATENT DOCUMENTS

| | | | | |
|---|---|---|---|---|
| 4,762,740 | A * | 8/1988 | Johnson et al. | 428/68 |
| 5,048,441 | A * | 9/1991 | Quigley | 114/90 |
| 5,188,872 | A * | 2/1993 | Quigley | 428/36.2 |
| RE35,081 | E * | 11/1995 | Quigley | 428/36.2 |
| 5,500,164 | A * | 3/1996 | Livesay et al. | 264/459 |
| 5,556,677 | A * | 9/1996 | Quigley et al. | 428/36.2 |
| 5,615,508 | A * | 4/1997 | Miller et al. | 42/71.01 |
| 5,636,836 | A | 6/1997 | Carroll et al. | |
| 5,888,601 | A * | 3/1999 | Quigley et al. | 428/36.1 |
| 6,048,488 | A * | 4/2000 | Fink et al. | 264/510 |
| 6,129,962 | A | 10/2000 | Quigley et al. | |
| 6,231,941 | B1 * | 5/2001 | Cundiff et al. | 428/36.3 |
| 6,423,388 | B1 * | 7/2002 | Bateson et al. | 428/36.3 |
| 6,589,618 | B2 * | 7/2003 | Cundiff et al. | 428/36.3 |
| 6,857,452 | B2 * | 2/2005 | Quigley et al. | 138/125 |
| RE39,554 | E * | 4/2007 | Steele et al. | 428/102 |
| 2001/0013669 | A1 * | 8/2001 | Cundiff et al. | 264/103 |
| 2002/0008177 | A1 | 1/2002 | Violette | |
| 2002/0061374 | A1 | 5/2002 | O'Brien et al. | |
| 2004/0058108 | A1 * | 3/2004 | McKague et al. | 428/36.3 |
| 2005/0042109 | A1 | 2/2005 | Kovalsky et al. | |

FOREIGN PATENT DOCUMENTS

| | | |
|---|---|---|
| GB | 2 262 315 A | 6/1993 |
| JP | 50-145474 | 11/1975 |
| JP | 56-14518 B2 | 4/1981 |
| JP | 61-104732 | 5/1986 |
| JP | 63-2786 | 1/1988 |
| JP | 1-25699 B2 | 5/1989 |
| JP | 4-73132 A | 3/1992 |
| JP | 5-240002 A | 9/1993 |
| JP | 7-241359 A | 9/1995 |
| JP | 8-53092 A | 2/1996 |
| JP | 8-126724 A | 5/1996 |
| JP | 8-150665 A | 6/1996 |
| JP | 2003-94448 A | 4/2003 |
| JP | 2004-209701 A | 7/2004 |
| JP | 2006-159457 A | 6/2006 |
| WO | 98/51481 | 11/1998 |

OTHER PUBLICATIONS

Chinese Office Action issued on Aug. 27, 2010, in Chinese Patent Application No. 200680015082.0 (with English Translation).

Notice of Reasons for Rejection issued Jun. 7, 2011 in Japanese Patent Application No. 2008-509956 (Submitting English Translation only).

Decision for Rejection issued Apr. 17, 2012 in Japanese Patent Application No. 2008-509956 (Submitting English Translation only).

* cited by examiner

METHOD FOR THE MANUFACTURING OF A HOLLOW FIBER REINFORCED STRUCTURAL MEMBER

The present invention relates to a hollow fiber reinforced structural member, in particular for use with air vehicles, for example as (part of) landing gears, blades for propellers and blades for helicopters. Structural members for air vehicles like struts and braces for aircraft landing gears, used to transfer mostly unidirectional loads, are traditionally made in metals such as steel, aluminum, or titanium. Considerable weight reduction can be achieved by using fiber reinforced plastic material. An example of such a material is epoxy resin matrix with reinforcement by carbon fibers. These materials are traditionally used in aerospace in thin-walled, slender constructions such as the wings or the empennage.

One of the problems of application of these materials in the landing gear, are the highly concentrated loads in the landing gear, requiring very large wall thicknesses in relation to their width. These large wall thicknesses can only be manufactured in laminated composites by stacking a very large number of relatively thin layers on each other, making this process very labor intensive and therefore costly. In the past there have been efforts to manufacture these types of components in traditional prepreg composites, but these have never been successful due to the high cost of material and labor.

One of the methods to reduce cost is to use liquid molding technologies such as RTM (Resin Transfer Molding). With these methods the fiber reinforcements are first completely assembled into a preform, after which this preform is injected with the liquid resin in a negative mold. Although this can mean an improvement with respect to cost, the amount of labor involved in making the preform is still very high.

Several methods for mechanizing the manufacture of the preform have developed in the past, such as 2D and 3D braiding, 3D weaving, non-crimp fabrics and stitched fabrics. All of these methods suffer specific limitations in the geometry and lay-up they can manufacture. With braiding for example only a limited number of lengthwise fibers can be implemented, whereas with weaving and fabrics only flat or semi-flat shapes can be manufactured. All of these methods are not suitable for the beam type components typical for aircraft landing gear components.

The present invention on the one hand aims at reducing costs for the manufacturing of hollow fiber reinforced structural members and on the other hand improving the quality thereof. Therefore the method according to the invention comprises the steps of providing a first circular braiding layer,
positioning a flat strengthening body comprising at least one fabric layer having warp fibers and a woof fiber against a part of the surface of the first braiding layer,
providing a second braiding layer around the first braiding layer and the strengthening body,
positioning the combination of the first braiding layer, the strengthening body and the second braiding layer in a mould,
impregnating the combination with resin,
removing the combination as impregnated with a resin from the mould.

Structural members which are manufactured according to the invention have the important advantage that they can be loaded from more directions, for example for offering resistance against lateral forces and brake forces during use of the hollow structural members, since the warp fibers and woof fibers contribute to the strength and rigidness of the structural member in question. Without use of a strengthening body like with the present invention, in comparison more braiding layers should be used causing the thickness of the wall to increase.

The strengthening advantage is in particular achieved when, according to a further preferred embodiment, the strengthening body comprises a stack of fabric layers.

A good connection between the braiding layers and the strengthening body can be realized by injecting at elevated pressure and elevated temperature a resin, preferably a thermo-setting resin, the flat strengthening body and the at least one braiding layer in the mould.

Preferably the braiding fiber, warp fibers and/or woof fiber is a glass fiber, a carbon fiber, an aramide fiber (Kevlar) or a polyamide fiber which fibers have good strengthening properties for the structural member in question.

The present invention finally also relates to a hollow fiber reinforced structural member manufactured according to the previously described method according to the present invention.

In general the object of the invention is to reduce cost while improving quality of composite braces compared to prior art. This can be achieved by combining a conventional (manual) but optimized method of placing fiber reinforcements in the preform, with a fully automated method of placing cross ply layers in the preform. More specifically the main number of layers can be mechanically cut from a preformed stack of fabric, resulting in a net-size stack of layers in the correct orientation and with the right dimensions for the preform. These stacks are placed in the correct location and orientation on a mandrel. Before and after the placement of the pre-cut stacks, a layer of fabric is braided onto the mandrel assembly. This can be performed on a so called over braiding machine, consisting of a braiding machine with a mechanism to move the mandrel and preform in longitudinal direction along the rotation centerline of the machine. By moving the mandrel while braiding, a woven layer is created on the mandrel. On top of this layer pre-cut stacks can be placed in specific positions again, and the process is repeated again with braiding another layer.

One of the variables in this over braiding process is the relation between rotational speed of the braiding bobbins and longitudinal speed of the mandrel, as well as the circumference of the mandrel with already present layers, since these both determine the angle of the fibers and thickness of the layer on each cross-section. By varying these parameters either the thickness of the layers or the angle of the braiding fibers can be varied.

Figure 2:
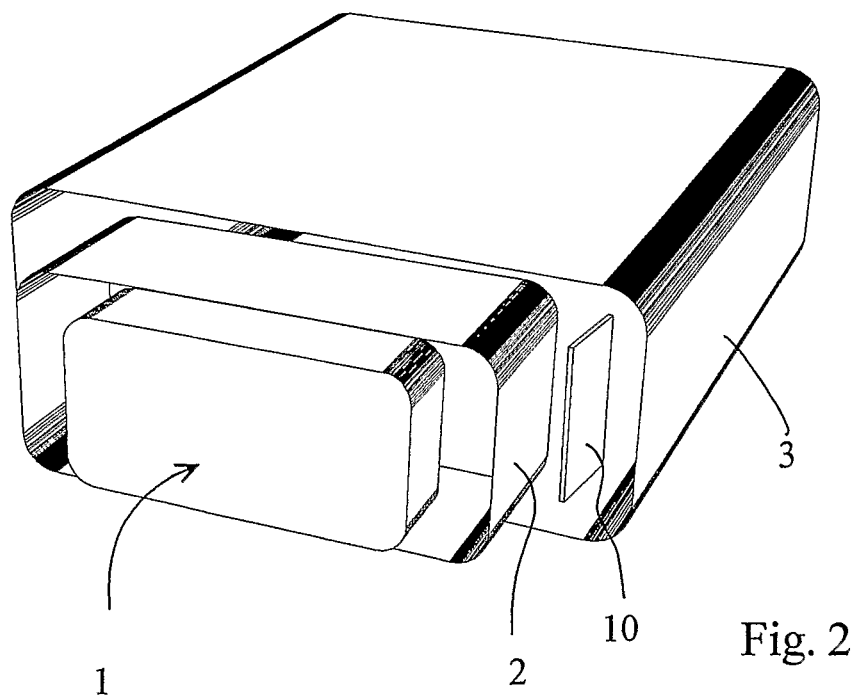

Next the invention will be elucidated referring to the description of a preferred embodiment of the present invention and to the following schematic figures:

FIG. 1 shows a cross section of a structural member during manufacturing thereof using the method according to the invention; and FIG. 2 shows a perspective view of the structural member during an earlier stage of the manufacturing thereof.

FIG. 1 shows a mandrel 1 having a rectangular cross section with rounded corners. Mandrel 1 is located at the location of the final internal part of a hollow fiber reinforced structural member which has been manufactured according to a first preferred embodiment of the method according to the invention. A circumferential first braiding layer 2 is braided around the mandrel 1. For sake of clarity a certain distance is present in FIG. 1 between the mandrel 1 and the first braiding layer 2, which distance actually does not exist.

The braiding of the first braiding layer (as well as the second braiding layer 3 and third braiding layer 4 yet to be discussed) is performed by supplying braiding fiber from a supply point 5 according to dotted line 8 towards mandrel 1 during simultaneous rotation of mandrel 1 around center line 6 according to arrow 7. Simultaneously the mandrel 1 is moved to and from perpendicular to the plane of the drawing causing the fibers to define in side view a V-shape having a apex angle for example of 90 degrees or 120 degrees dependent on the one hand the rotational speed of mandrel 1 and on the other hand the speed with which mandrel 1 is moved to and from perpendicular to the plane of the drawing. As an alternative it is also possible that the supply point 5 rotates about (the center line 6 of) mandrel 1 in the direction of arrow 9 and/or that the supply point 5 (in stead of mandrel 1 or possibly even simultaneously with mandrel 1) moves to and from perpendicular to the phase of the drawing. The relative motion between fiber 8 and mandrel 1 is relevant in that respect. If wanted a part of fiber 8 which has just been winded can during braiding be pressed against with pressure rolls.

Once the first braiding layer 2 has reached a desired thickness the braiding, or in other words the relative motion between supply point 5 and mandrel 1 as well as the supply of fiber 8 via supply point 5, is interrupted after which a flat strengthening body 10 is provided at the short opposite sites of mandrel 1 on the outer side of the first braiding layer 2 by positioning these strengthening bodies 10 either by hand or mechanically, for example with the aid of a pick and place robot, against the parts in question on the outer side of the first braiding layer 2, and the fixation at that location for example with the aid of binding aid, mechanical pins or other fixation means.

Each strengthening body is constituted by a number of fabric layers having warp fibers and woof fibers which layers are stacked on each other. During an earlier stage the fabric layers have been interconnected with the use of for example a thermoplastic binder at elevated pressure and temperature.

Next the braiding process is continued causing a second braiding layer 3 to start developing which second braiding layer 3 presses the strengthening bodies 10 against the first braiding layer 2. FIG. 2 relates to this situation. Next further strengthening bodies like strengthening bodies 11 in FIG. 1 and further braiding layers like the third braiding layer 4 in FIG. 1 can be made in a similar way also dependent on the strength and rigidness which is required.

As soon as the desired amount of braiding layers and strengthening bodies is provided, in a next step the entirety including mandrel 1 is placed in a hard mould which surrounds the entirety completely after which the braiding layers 2, 3, 4 and the strengthening bodies 10, 11 are injected with a resin, for example a thermo-hardening resin like epoxy resin, at elevated temperature and elevated pressure. After hardening of the resin the outer mould is opened and the mandrel 1 is being removed resulting in a hollow fiber reinforced structural member which mechanically can be processed for example by machining, drilling or cutting. Such a product may be applied for instance as part of a landing gear, as blade for a propeller or as blade for a helicopter.

Although the strengthening bodies 10, 11 in the above described preferred embodiments are provided at flat sides, it is also possible within the frame work of the present invention that the strengthening bodies 10, 11 are provided at rounded locations, for example at the location of the rounded corners of mandrel 1.

The invention claimed is:

1. Method of manufacturing a hollow fiber-reinforced structural member for air vehicles, comprising:
   providing a mandrel,
   providing a first circumferential braiding layer formed by braiding fibers around the mandrel,
   positioning a flat strengthening body comprising at least one fabric layer having warp fibers and woof fibers against only a part of a surface of the first braiding layer,
   providing a second braiding layer formed by braiding fibers around the first braiding layer and the strengthening body,
   positioning the mandrel and a combination of the first braiding layer, the strengthening body and the second braiding layer in a mold which completely surrounds the mandrel and the combination,
   impregnating the combination with resin, by injecting the flat strengthening body and the first braiding layer and the second braiding layer in the mold with the resin and
   removing the combination as impregnated with the resin from the mold.

2. Method according to claim 1, wherein the strengthening body comprises a stack of fabric layers.

3. Method according to claim 1 or claim 2, wherein the resin is a thermo-setting resin.

4. Method according to claim 1, wherein the braiding fiber, warp fibers and/or woof fibers are a glass fiber, a carbon fiber, an aramide fiber or a polyamide fiber.

5. The hollow fiber-reinforced structural member manufactured by a method according to claim 1, the structural member comprising:
   the first circular braiding layer;
   the strengthening body comprising the at least one fabric layer having the warp fibers and the woof fibers, the strengthening body being positioned against only the part of the surface of the first braiding layer; and
   the second braiding layer around the first braiding layer and the strengthening body,
   wherein the combination of the first braiding layer, the strengthening body, and the second braiding layer is impregnated with the resin.

6. Method according to claim 2, wherein the braiding fiber, warp fibers and/or woof fibers are a glass fiber, a carbon fiber, an aramide fiber or a polyamide fiber.

7. Method according to claim 3, wherein the braiding fiber, warp fibers and/or woof fibers are a glass fiber, a carbon fiber, an aramide fiber or a polyamide fiber.

8. The hollow fiber-reinforced structural member manufactured by a method according to claim 2, the structural member comprising:
   the first circular braiding layer;
   the strengthening body comprising the at least one fabric layer having the warp fibers and the woof fibers, the strengthening body being positioned against only the part of the surface of the first braiding layer; and
   the second braiding layer around the first braiding layer and the strengthening body,
   wherein the combination of the first braiding layer, the strengthening body, and the second braiding layer is impregnated with the resin.

9. The hollow fiber-reinforced structural member manufactured by a method according to claim 3, the structural member comprising:
   the first circular braiding layer;
   the strengthening body comprising the at least one fabric layer having the warp fibers and the woof fibers, the strengthening body being positioned against only the part of the surface of the first braiding layer; and
   the second braiding layer around the first braiding layer and the strengthening body,
   wherein the combination of the first braiding layer, the strengthening body, and the second braiding layer is impregnated with the resin.

10. The hollow fiber-reinforced structural member manufactured by a method according to claim 4, the structural member comprising:
- the first circular braiding layer;
- the strengthening body comprising the at least one fabric layer having the warp fibers and the woof fibers, the strengthening body being positioned against only the part of the surface of the first braiding layer; and
- the second braiding layer around the first braiding layer and the strengthening body,
- wherein the combination of the first braiding layer, the strengthening body, and the second braiding layer is impregnated with the resin.

11. Method according to claim 1, wherein the part of the surface of the first braiding layer that the flat strengthening body is positioned against is an outer surface of the first braiding layer.

12. Method according to claim 1, wherein the flat strengthening body is positioned against only a circumferential part of the surface of the first braiding layer.

13. Method according to claim 1, wherein the combination as impregnated with the resin is removed from the mandrel.

14. Method according to claim 1, wherein the flat strengthening body is positioned against only a circumferential part of the surface of the first braiding layer, and
- wherein the combination as impregnated with the resin is removed from the mandrel.

* * * * *